April 24, 1934. J. C. WOODFORD Re. 19,148
APPARATUS FOR SUPPLYING AIR UNDER PRESSURE
Original Filed Jan. 21, 1925
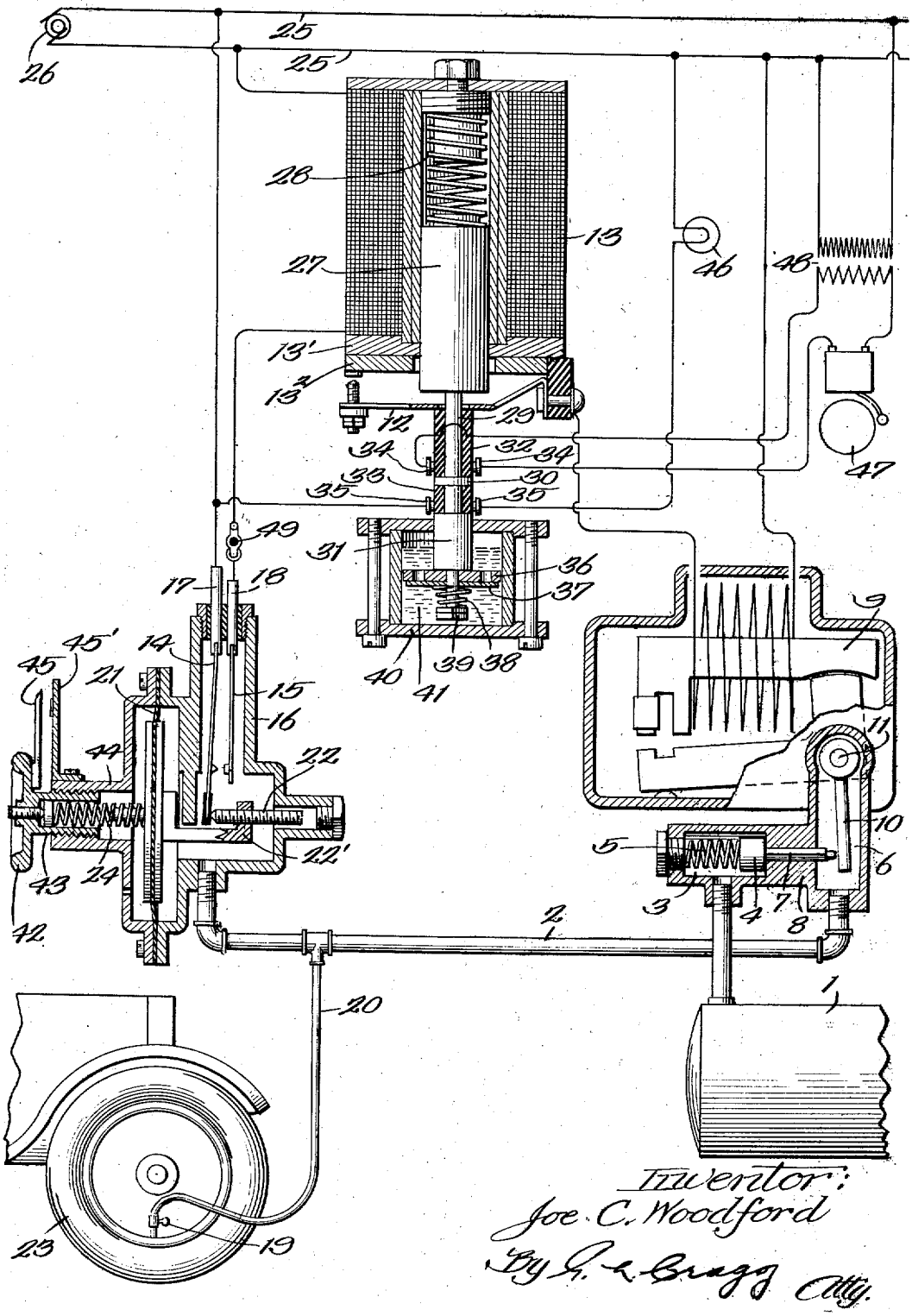
Inventor:
Joe C. Woodford
By G. E. Bragg Atty.

Reissued Apr. 24, 1934

Re. 19,148

UNITED STATES PATENT OFFICE 19,148

APPARATUS FOR SUPPLYING AIR UNDER PRESSURE

Joe C. Woodford, Bryan, Ohio, assignor, by direct and mesne assignments, to Service Station Equipment Company, Bryan, Ohio, a corporation of Delaware Original No. 1,655,003, dated January 3, 1928, Serial No. 3,893, January 21, 1925. Application for reissue December 21, 1929, Serial No. 415,878

11 Claims. (Cl. 221—73.5)

My invention relates to a method of and an apparatus for supplying air under pressure from sources which contain air under higher pressure than that which is to be received in the spaces to be supplied. My invention is of particular service in connection with apparatus that is employed for supplying pneumatic wheel tires with air. By means of my invention the apparatus may be set to supply the requisite amount of air, and after having supplied the requisite amount of air the source of air under higher pressure will be automatically disconnected. Provision is made whereby a passage is connected with a tire to be filled, and communication is opened between said passage and a source of air under high compression whenever the pressure in the passage falls to a predetermined limit, the communication being closed each time the pressure in the passage rises above said limit, but the closing action being delayed to afford an interval during which pressure in the passage may approach that of the source. In this way a tire is filled by air from a passage in which the pressure varies between a limit of pressure selected as the ultimate pressure to be produced in the tire, and a pressure materially higher than said limit, and this high average pressure in the passage results in inflating the tire quickly.

In practicing my invention piping is employed through which air is conveyed from its source, there being a valve between the source and the piping, this valve being constrained to move in a closing direction. Mechanism is employed that enables or permits the valve to close, this mechanism being so connected with the piping and of such construction as to be controlled by the pressure of the air conveyed by the piping, the mechanism being operable by the air upon attaining sufficient pressure, to enable the closure of the valve. Thus, when the apparatus is used for filling pneumatic tires, the valve which was opened by suitable means for the purpose of supplying air to such a tire, is enabled to close when the pressure of the air flowing in the piping has reached a predetermined amount. The mechanism that enables the closure of the valve also desirably takes part in opening the valve, this mechanism being preferably constrained to operate reversely upon sufficient reduction of the air pressure to effect, or take part in effecting, the opening adjustment of the valve.

In the preferred embodiment of the invention said valve is provided with a spring which is enabled to close the valve after the pressure of the air passed by the valve to the piping has reached a predetermined value, a result which arises with the aid of the valve controlling mechanism described. In the preferred embodiment of the invention the valve controlling mechanism is located in a chamber into which air is discharged from the piping, there being in this chamber an operating element which is moved in one direction by the air admitted to the chamber when this air attains sufficient pressure, and which is constrained to move in the reverse direction when the air pressure has been sufficiently reduced. The aforesaid operating element is in controlling relation to, or is enabled to take part in controlling the mechanism that is adapted to open the valve, and performs this function when the pressure of the air is sufficiently reduced to permit the operating element of this mechanism to act of itself to secure this result. When the pressure of the air being supplied has reached a predetermined value the operating element is reversely operated to relieve the valve of its opening influence and permit it to be closed by its spring. In the preferred embodiment of the invention a magnet is employed in direct opening relation to the valve, the circuit of this magnet being governed by a relay, the circuit of the relay, in turn, being governed by a switch which includes a movable contact arm which is the preferred form of the aforesaid operating member located within the aforesaid chamber. This switch arm is constrained to engage its contact, when the pressure within the chamber is sufficiently reduced, to energize the relay, the circuit of the valve opening magnet being closed by the armature switch of the relay each time the relay is energized. When the pressure of the air within the chamber reaches a predetermined value it operates upon a diaphragm which then moves to place the aforesaid switch arm in an open circuit adjustment to de-energize the relay and the magnet controlled by the relay, whereupon the valve is permitted to close, this closing action of the valve being delayed for an interval, as will be explained later. The point at which the diaphragm may thus respond to the pressure of the air received in the chamber may be regulated by a handle or knob controlled spring, so that the apparatus will not cease to function until air under the particular pressure desired is supplied to the tire or other space that is to be furnished therewith.

In the preferred embodiment of the invention the piping is provided with a second valve which is an outlet valve, this second valve being manually opened each time air is to be supplied and being manually closed when air under the desired pressure has been supplied in order that the air may be trapped within this chamber, at this pressure, to maintain the valve controlling member in the chamber in the adjustment wherein the first valve may remain closed. However, the outlet valve may be omitted to permit an adjustment of the member within the chamber that would cause the other valve to open were it not for a device that is then employed for rendering this member inoperative. In the case of the electromagnetic control of the supply valve in a system lacking the outlet valve, a manually controlled switch may be employed in the circuit of the relay for the purpose stated.

The invention will be more fully explained in connection with the accompanying drawing which is a diagrammatic illustration of the preferred embodiment thereof as constructed and arranged for filling pneumatic tires.

The tank 1 contains air under pressure that is much higher than that which is to be supplied to pneumatic tires. Air may be supplied from this tank by way of piping 2. The air passes from the tank into the valve chamber 3 which is connected at its inlet end to the tank and at its outlet end with said piping. A valve 4 is located within the valve chamber and is pressed upon by a spring 5 in a closing direction, said valve being constrained by the spring to adjust itself in closed position when no air is to be supplied. The valve chamber is inclusive of an enlargement 6 thereof into which the valve stem 7 projects. This valve stem is square or polygonal in contour while the passage in the wall 8 that separates the two parts of the valve chamber and through which the valve stem operates, is circular, so that when the valve is unseated air may flow to the piping. An electro-magnet 9 is provided for opening the valve, the armature of the magnet carrying an operating arm 10 which is fixed upon the armature shaft 11 that passes into the valve chamber portion 6 through air tight bearings. When the magnet is energized the arm 10 is turned to move the valve stem 7 and the valve 4 inwardly against the force of the spring 5 to permit air to flow through the piping. The circuit of the magnet includes the armature switch 12 of a relay 13. The relay circuit includes a controlling switch that is inclusive of an operating switch contact arm 14 and a contact member 15, complemental to this arm. The switch members 14 and 15 are located within an air chamber 16, there being suitable air tight circuit connections 17, 18, extending through the chamber and including the switch members in circuit with the relay winding. When the valve 4 is to be opened the relay 13 is energized to energize the magnet 9 whose armature thereupon opens the valve. If the piping is supplied with an outlet valve, such as that indicated at 19 in connection with the pipe 20 branching from the piping 2, this valve 19 is normally closed to trap air under pressure within the chamber 16 to hold the switch arm 14 away from the contact 15 when the apparatus is not in use, a result which is secured with the aid of a diaphragm 21 which is subject to the pressure of the air in said chamber and which then moves the switch arm 14 from its contact 15 through the intermediation of the abutment screw 22 that presses upon the switch arm 14 for this purpose, this abutment screw being carried upon a bracket 22′ that is provided upon the diaphragm. When air is to be supplied to the tire, indicated at 23, the branch pipe 20 is first connected with the tire nipple whereafter the valve 19 is opened. When this valve is opened the pressure in the chamber 16 is reduced to permit the spring 24 to move the diaphragm 21 in a direction to move the abutment 22 out of actuating engagement with the switch arm 14. When the abutment 22 is thus withdrawn from the switch arm 14 this switch arm engages its contact 15, the switch arm being constrained to move in a switch closing direction by reason of its own resilience. When the switch 14, 15 is closed, the circuit of the relay 13 is closed. When the relay is energized its armature switch 12 is closed to close circuit through the valve opening magnet 9. Switch 12 is of light spring metal and allows some upward movement of core 27 after the switch is closed. The relay winding is shown as being in bridge of the supply mains 25 extending from the generator 26, the switch 14, 15 being in series with the relay winding and in the same bridge therewith. The armature switch 12 of the relay is serially included with the winding of the magnet 9 and in another bridge therewith between the mains 25. The magnet portion of the relay is in the form of a solenoid having an iron core 27 which is thrust outwardly by a spring 28 when the relay is de-energized and against the force of which spring said core is moved when the relay is energized. The iron core of the relay carries a brass rod 29 that is in electrical connection therewith. This brass rod carries metallic flanges or enlargements 30, 31 that are in electrical connection therewith, and also carries two collars of insulation 32, 33, between which the portion 30 is disposed. The brass rod 29 and the parts 30, 31, 32, and 33, carried thereon, are disposed between the brushes 34 of one pair, and the brushes 35 of another pair in a different zone from that in which the brushes 34 are disposed. When the relay is energized the brushes 34 are electrically connected by the portion 30 and the brushes 35 are connected by the portion 31. The circuit of the magnet 9 that is established upon the energization of the relay may be traced from the upper brush of the generator 26 through the left hand brush 35, the then elevated metallic element 31, the rod 29, the core 27, the metallic spool head 13′, with which the core 27 has sliding electrical contact, the metallic ring $13^2$, the switch arm 12 then in electric connection with the ring, the winding of the magnet 9, the lower main 25 to the lower brush of the generator 26. When the relay is energized it opens the valve 4 as previously described, whereupon air finds passage through the piping 2, the branch pipe 20, to the tire 23 by way of the opened outlet valve 19, the switch arm 14 having engaged its contact 15 when the valve 19 was initially opened, to enable the magnet 9 to open the valve, as described. When the air flows through the pipe 2 it is not only received in the tire 23 but is also supplied to the chamber 16 to cause the movement of the diaphragm 21 to the left, whereupon the abutment 22 is pushed against the switch arm 14 to separate this switch arm from the contact 15 to open the relay circuit. The spring 28 is then effective to depress the core 27. When this core is fully depressed the metallic enlargement 31 is disengaged from the brushes 35 to open circuit of the magnet 9 which includes the left hand one of these brushes. Since valve 4 admits air more rapidly than it normally passes into the tire and pressure in line 2 is built up instantly above that for which spring 24 is set, relay 13 is instantly de-energized upon opening of the valve 4, and I provide means for retarding the release of the solenoid core 27 to delay opening of the circuit of the magnet in order to provide an interval during which pressure in line 2 may be higher than the ultimate pressure in the tire and air may be forced into the tire rapidly. As illustrated, this retarding means includes an apertured plate 36, a valve disk 37 pressed against this plate by a spring 38 to close the apertures therein, an abutment 39 upon the rod 29 against which the bottom end of the spring 38 is engaged, and a chamber 40 surrounding the rod 29 and its enlargement 31 and enclosing the parts 36, 37, 38 and 39. This chamber 40 contains oil 41 which seeps slowly around the plate 36 when the spring 28 lowers the solenoid core. The delay effected in the movement of the metallic element 31 out of engagement with the left hand brush 35, and switch 12 out of engagement with contact $13^2$, is sufficient to permit an appreciable amount of air to be passed to the tire. When the enlargement 31 becomes separated from the left hand brush 35 the magnet 9 is de-energized to permit the spring 5 to close the valve 4. If sufficient air has not been supplied to the tire the pressure of the air within the chamber 16 again becomes reduced to permit the spring 24 to move the abutment 22 away from the switch arm 14, whereupon this switch arm again engages its contact 15 to again energize relay 13 with the results before described.

Spring 38 yields and allows a comparatively unobstructed upward movement of core 27, so that closing of switch 12 follows promptly the energizing of relay 13, and valve 4 is opened substantially at the time when pressure in line 2 falls to that at which spring 24 is set. Thus the valve is opened when pressure in line 2 drops to the predetermined limit and is maintained open for a limited time during which the pressure in the line is built up and maintained above that limit. These operations are repeated until sufficient air is accumulated within the tire whereupon the diaphragm 21 is again and finally pressed to the left by the air that is then under sufficient pressure to maintain the diaphragm in this position when the outlet valve 19 is closed, an adjustment which is effected before the branch pipe 20 is disconnected from the tire. The switch 14, 15, remains opened to permit the spring 5 to maintain the valve 4 closed until the branch pipe 20 is connected with another tire requiring refilling, whereupon the pressure of the air in the chamber 16 is again reduced by opening the outlet valve 19 to permit the spring 24 to move the diaphragm 21 to the left to release the switch arm 14 and permit it to engage the contact 15 as and with the results hitherto set forth. The pressure at which the diaphragm is to be operated by the air in a manner to maintain the switch 14, 15, opened, is regulable by the knob or handle 42 whose hub 43 is screwed into the tubular extension 44 of the chamber 16. This handle is provided with an index 45 that may be placed in registry with scale marks provided upon the index bracket 45′ and which marks indicate the various pressures to which the apparatus may be adjusted.

The lamp 46 is in bridge with the mains 25, both brushes 35 being in the same bridge with the lamp. When the relay is energized the brushes 35 are connected by the element 31 to light the lamp, and when the relay is de-energized and its core 27 is fully depressed the lamp 46 is extinguished. The lamp will thus intermittently glow during the tire filling process and will cease to glow when the tire is filled. An audible signal such as the bell 47 may also be employed, this bell including an operating electromagnet which is in circuit with the brushes 34 that are connected by the element 30 when the relay is energized to cause the bell to sound when air is being supplied, the bell ceasing to operate when the valve 4 is closed, the bell thus accomplishing audibly what the lamp 46 accomplishes visually. If the generator 26 furnishes alternating current a step-down transformer 48 is desirably interposed between the mains 25 and the bell 47.

If the outlet valve 19 for the piping 2 or the branch pipe 20 is omitted, the pressure in the chamber 16 is not maintained when the valve 4 is closed, the switch 14, 15 being closed when the valve 4 is closed. To prevent the switch when normally or idly closed, from energizing the relay 13, I employ a switch 49 in series with the switch 14, 15, this switch 49 being opened when the switch 14, 15 is idly closed and being closed when the apparatus is being employed for its purpose. Either of the elements 19, 49 serves to start the apparatus into operation, the element 19 functioning when it is opened to permit the passage of air from the piping, and the element 49 functioning when it is closed to connect the relay in circuit.

In the appended claims, "when" is used in its exact meaning of "the time at which".

What I claim is:

1. In a device for charging a receiver with compressed air, the combination of a source of compressed air, adjustable means for limiting the ultimate pressure to which said receiver is to be charged, a conduit connecting the source of compressed air with the receiver, a valve in said conduit, means tending to close said valve, means opening said valve when the pressure in the conduit falls to that at which the device is adjusted, and means timing the open interval of said valve, whereby said valve intermittently opens, dwells in open position, and closes, this cycle continuing until pressure in the receiver reaches that to which the device is adjusted.

2. In a device for charging a receiver with compressed air, the combination of a source of compressed air, a conduit connecting the source with a receiver to be filled, a valve controlling communication between the source and conduit, and an automatic device for opening the valve in response to pressure in the conduit falling to a predetermined limit and closing the valve in response to pressure in the conduit rising above the limit, the device comprising means to delay the valve-closing response longer than the valve-opening response is delayed.

3. In a device for charging a receiver with compressed air, the combination of a source of compressed air, a conduit connecting the source with a receiver to be filled, a valve controlling communication between the source and conduit, and an automatic device for opening the valve instantly when pressure in the conduit falls to a predetermined limit and for closing the valve a material length of time after the pressure in the conduit rises above the limit.

4. In a device for charging a receiver with compressed air, the combination of a source of compressed air, a conduit connecting the source with a receiver to be filled, a valve controlling communication between the source and conduit, a chamber communicating with the conduit, a member movable outward by pressure in the chamber, means tending to move the member inward, means opening the valve in response to inward movement of the member and closing the valve in response to outward movement of the member, and means to delay the valve-closing response longer than the valve-opening response is delayed.

5. In a device for charging a receiver with compressed air, a conduit connecting the source with a receiver to be filled, a valve controlling communication between the source and conduit, a chamber communicating with the conduit, a member movable outward by pressure in the chamber, means tending to move the member inward, means opening the valve when the member moves inward and closing the valve a material length of time after an outward movement of the member.

6. In a device for charging a receiver with compressed air, the combination of a source of compressed air, a conduit connecting the source with a receiver to be filled, a valve controlling communication between the source and conduit, and an automatic device for opening the valve in response to pressure in the conduit falling to a predetermined limit and closing the valve in response to pressure in the conduit rising above the limit, the device comprising means to delay the valve-closing response longer than the valve-opening response is delayed, means for adjusting the limit, and indicating means connected to the adjusting means for indicating the limit for which the device is set.

7. The method of filling a tire to a predetermined limit of pressure, which consists in delivering through a passage to the tire a succession of charges of compressed air, at least the major portion of each charge being delivered to the tire at a pressure substantially higher than said limit and the successive charge being introduced before the pressure falls materially below said limit, and utilizing pressure of air in said passage to automatically stop the delivery of charges to the passage when the pressure in the tire reaches said limit.

8. The method of charging a receiver with compressed air approximately to a predetermined limit, which comprises connecting a passage to the receiver, introducing successive charges of compressed air to the passage with sufficient rapidity to maintain the average pressure in the passage above said limit without allowing the pressure in said passage to fall at anytime materially below said limit, and utilizing pressure of air in the passage to stop the delivery of additional charges after the pressure in the receiver reaches said limit.

9. The method of charging a receiver with compressed air approximately to a predetermined limit, which comprises connecting a passage to the receiver, introducing into the passage a limited charge of air with sufficient rapidity and to such an amount as to materially raise the pressure in the passage immediately after, and as often as, the pressure in the passage drops to said limit, whereby pressure in said passage never falls materially below said limit.

10. The method of charging a receiver with compressed air approximately to a predetermined limit, which comprises connecting a passage to the receiver, and intermittently increasing the pressure in the passage immediately when, and as often as, the pressure in the passage drops to said limit, whereby the receiver is filled to said limit by air under pressure mostly above and never below said limit.

11. In tire inflating apparatus, an air service line adapted to discharge air into a tire, an inlet valve for said line adapted, when open, to admit air more rapidly than it normally passes into the tire, and element movable in response to changes in pressure in said line, connections between said element and said valve for opening said valve when the pressure from said line on said element falls to a predetermined pressure and closing the valve only when the pressure from the line on said element rises materially above said predetermined pressure, adjustable means operative on said connections to vary said predetermined pressure, and an indicating device adjustable with said means and indicating said predetermined pressure.

JOE C. WOODFORD.